US011635487B2

(12) United States Patent
Hayashi

(10) Patent No.: US 11,635,487 B2
(45) Date of Patent: Apr. 25, 2023

(54) METHOD AND APPARATUS FOR CONTROLLING RADAR TRANSMISSION BASED ON COMPARING RECEIVED RADIO WAVES

(71) Applicant: SOCIONEXT INC., Kanagawa (JP)

(72) Inventor: Joji Hayashi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 270 days.

(21) Appl. No.: 16/857,899

(22) Filed: Apr. 24, 2020

(65) Prior Publication Data

US 2020/0341130 A1 Oct. 29, 2020

(30) Foreign Application Priority Data

Apr. 25, 2019 (JP) .............................. JP2019-084244

(51) Int. Cl.
*G01S 7/02* (2006.01)
*G01S 7/28* (2006.01)
(Continued)

(52) U.S. Cl.
CPC ............ *G01S 7/023* (2013.01); *G01S 7/0232* (2021.05); *G01S 7/2806* (2013.01);
(Continued)

(58) Field of Classification Search
CPC ...... G01S 7/023; G01S 7/0232; G01S 7/2806; G01S 7/2922; G01S 13/282;
(Continued)

(56) References Cited

U.S. PATENT DOCUMENTS

2010/0073218 A1\* 3/2010 Stockmann ......... G01S 13/5248
342/146
2016/0219598 A1\* 7/2016 Ghosh ................... H04W 16/14
(Continued)

FOREIGN PATENT DOCUMENTS

JP H05-130053 A 5/1993
JP 2001-237846 A 8/2001
(Continued)

OTHER PUBLICATIONS

Japanese Office Action dated Feb. 7, 2023 for corresponding Japanese Patent Application No. 2019-084244, with English machine translation (concise explanation).

*Primary Examiner* — Donald H B Braswell
(74) *Attorney, Agent, or Firm* — McDermott Will & Emery LLP

(57) ABSTRACT

A method for controlling a radar apparatus that detects an object using frequency modulation includes: performing first reception of a radio wave in a state where transmission of a radio wave for detecting the object is stopped, to obtain a first reception signal; performing second reception of a radio wave in a state where the transmission of the radio wave is stopped, to obtain a second reception signal, after the performing of the first reception; acquiring a strength of a difference signal between the first reception signal and the second reception signal; comparing the strength with a threshold value; and starting the transmission of the radio wave in a case where the strength is equal to or less than the first threshold value in the comparison.

21 Claims, 8 Drawing Sheets

(51) Int. Cl.
*G01S 7/292* (2006.01)
*G01S 13/28* (2006.01)
*H04W 72/541* (2023.01)

(52) U.S. Cl.
CPC .......... *G01S 7/2922* (2013.01); *G01S 13/282* (2013.01); *H04W 72/541* (2023.01)

(58) Field of Classification Search
CPC .... G01S 13/343; G01S 13/347; G01S 13/931; G01S 7/021; G01S 7/36; G01S 7/4056; H04W 72/082
See application file for complete search history.

(56) References Cited

U.S. PATENT DOCUMENTS

| | | | |
|---|---|---|---|
| 2017/0257773 A1* | 9/2017 | Boudreau | G01S 7/021 |
| 2017/0299696 A1* | 10/2017 | Fuller | G01S 13/886 |
| 2019/0028899 A1* | 1/2019 | Yankevich | H04W 24/08 |
| 2019/0056476 A1* | 2/2019 | Lin | G01S 7/023 |
| 2019/0356408 A1* | 11/2019 | Sharp | H04K 3/226 |
| 2020/0296659 A1* | 9/2020 | Kunjar | H04W 4/024 |

FOREIGN PATENT DOCUMENTS

| | | |
|---|---|---|
| JP | 2011-232055 A | 11/2011 |
| JP | 2019-050859 A | 4/2019 |

\* cited by examiner

METHOD AND APPARATUS FOR CONTROLLING RADAR TRANSMISSION BASED ON COMPARING RECEIVED RADIO WAVES

CROSS REFERENCE TO RELATED APPLICATIONS

The present application is based on and claims priority of Japanese Patent Application No. 2019-084244 filed on Apr. 25, 2019. The entire disclosure of the above-identified application, including the specification, drawings and claims is incorporated herein by reference in its entirety.

FIELD

The present disclosure relates to a method for controlling a radar apparatus that detects an object using frequency modulation, and the radar apparatus.

BACKGROUND

As an apparatus for transmitting and receiving a radio wave, a wireless communication apparatus that performs wireless communication, a radar apparatus that detects an object, and the like, are known. Entering the era of Internet of Things (IoT), the popularity of these apparatuses is expected to further increase in the future.

In a case where a wireless communication device and a radar apparatus use radio waves in the same frequency band, the radio waves interfere with each other. Hence, there is disclosed a wireless communication apparatus that detects, before transmitting a radio wave, a radio wave having a possibility of interference, and transmits the radio wave when the radio wave having the possibility of interference is not detected (see Patent Literature 1).

CITATION LIST

Patent Literature

PTL 1: Japanese Unexamined Patent Application Publication No. 5-130053

SUMMARY

Technical Problem

However, with the technique described in Patent Literature 1, a radar apparatus that detects an object using the frequency modulation may fail to detect an external-apparatus radio wave correctly.

In view of this, the present disclosure provides, for a radar apparatus that detects an object using the frequency modulation, a method for controlling the radar apparatus that enables an external-apparatus radio wave to be detected correctly, and the radar apparatus.

Solution to Problem

A method for controlling a radar apparatus according to an aspect of the present disclosure is a method for controlling a radar apparatus that detects an object using frequency modulation, and includes: performing first reception of a radio wave in a state where transmission of a radio wave for detecting the object is stopped, to obtain a first reception signal; performing second reception of a radio wave in a state where the transmission of the radio wave is stopped, to obtain a second reception signal, after the performing of the first reception; acquiring a strength of a difference signal between the first reception signal and the second reception signal; comparing the strength with a first threshold value; and starting the transmission of the radio wave in a case where the strength is equal to or less than the first threshold value in the comparing.

A radar apparatus according to an aspect of the present disclosure is a radar apparatus that detects an object using frequency modulation, and includes: a first receiver that receives a radio wave in a state where transmission of a radio wave for detecting the object is stopped, to obtain a first reception signal; a second receiver that receives a radio wave in the state where the transmission of the radio wave is stopped, to obtain a second reception signal, after the first receiver obtains the first reception signal; a signal strength acquirer that acquires a strength of a difference signal between the first reception signal and the second reception signal; a comparator that compares the strength with a threshold value; and a radar controller that performs control to start the transmission of the radio wave in a case where the strength is equal to or less than the threshold value in the comparison.

Note that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Advantageous Effects

In view of this, the present disclosure provides, for a radar apparatus that detects an object using the frequency modulation, a method for controlling the radar apparatus that enables an external-apparatus radio wave to be detected correctly, and the radar apparatus.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
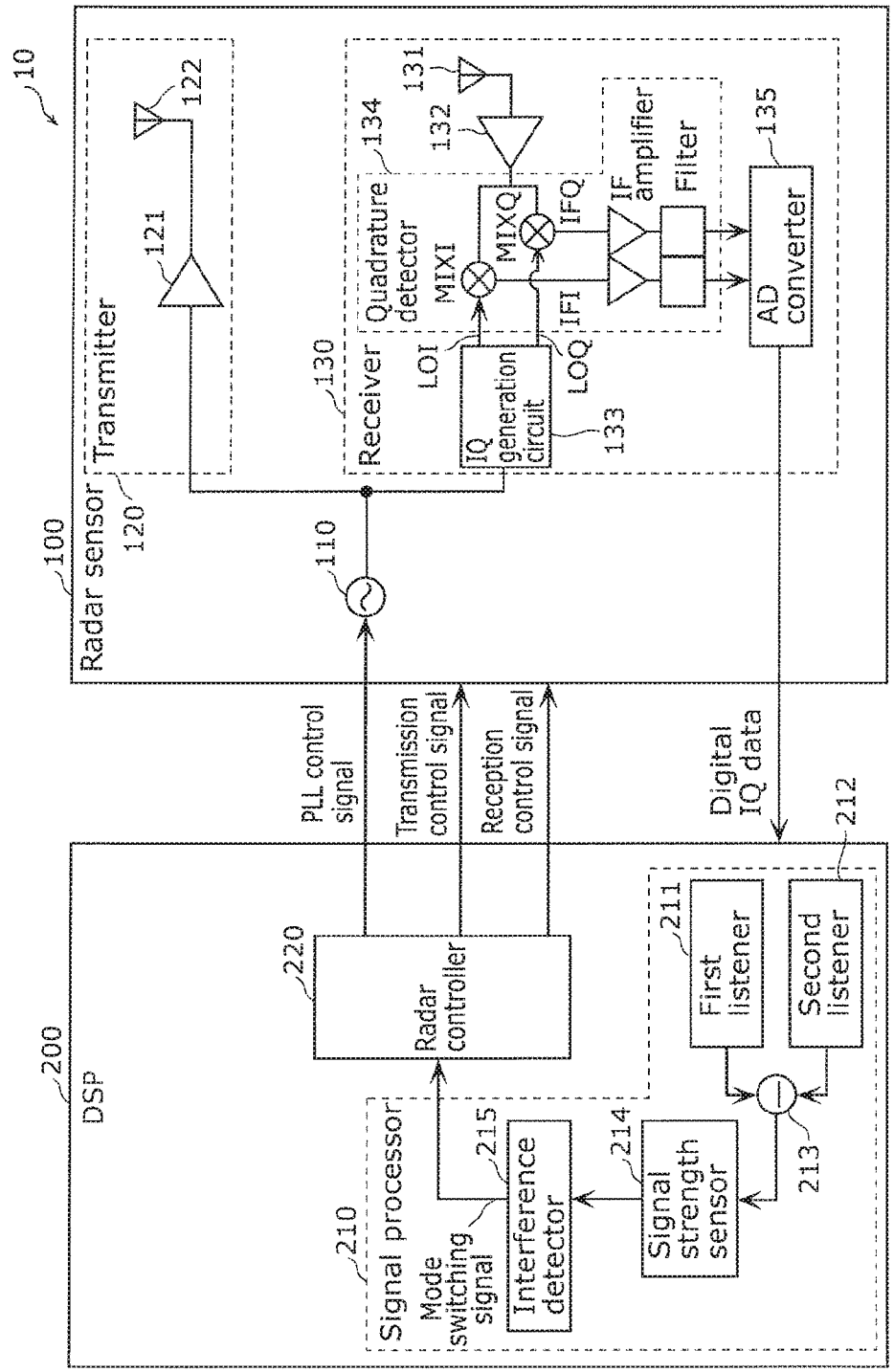
FIG. 1 is a block diagram illustrating a configuration of a radar apparatus according to the present embodiment.

A method for controlling a radar apparatus according to an aspect of the present disclosure is a method for controlling a radar apparatus that detects an object using frequency modulation, and includes: performing first reception of a radio wave in a state where transmission of a radio wave for detecting the object is stopped, to obtain a first reception signal; performing second reception of a radio wave in a state where the transmission of the radio wave is stopped, to obtain a second reception signal, after the performing of the first reception; acquiring a strength of a difference signal between the first reception signal and the second reception signal; comparing the strength with a first threshold value; and starting the transmission of the radio wave in a case where the strength is equal to or less than the first threshold value in the comparing.

Even in a case where the first reception signal and the second reception signal include noise that is caused by the frequency modulation of the radar apparatus and has a strength that changes with time, the difference signal is a signal from which the noise is removed. That is, the strength of the difference signal indicates the strength of an external-apparatus radio wave. The radar apparatus that detects an object using the frequency modulation is thereby enabled to detect the external-apparatus radio wave correctly.

Furthermore, for example, in the performing of the first reception, the radio wave may be received in a first reception frequency band that is specified in accordance with a frequency band used in the frequency modulation, and in the performing of the second reception, the radio wave may be received in a second reception frequency band that is specified in accordance with a frequency band used in the frequency modulation.

This enables a presence or an absence of a radio wave to be determined over a frequency band used by the radar apparatus for detecting an object. The interference with the radio wave from the external apparatus can be further reduced in detecting an object.

Furthermore, for example, the first reception frequency band and the second reception frequency band may be a same frequency band.

This enables the difference signal to be acquired over the entire frequency band of the received first reception signal and second reception signal.

Furthermore, for example, the first reception frequency band and the second reception frequency band may each include a plurality of channels, and in the comparing, comparison may be performed in each of the plurality of channels.

This enables which of the plurality of channels is used to be determined. For example, the radar apparatus can use a frequency band of a channel other than the channel the determined to be used to detect an object.

Furthermore, for example, the method may further include waiting for a predetermined time period in a case where the strength is greater than the first threshold value in the comparing, wherein the performing of the second reception, the acquiring of the strength, and the comparing may be executed again after the waiting.

This enables processes of from the performing the first reception to the comparing to be repeated. For example, in a case where communication or object detection of an external apparatus is terminated in a middle of repeating the processes from the performing the first reception to the comparing, the termination of the communication and the object detection of the external apparatus can be detected. The detection of an object can be performed reliably as compared with a case where the processes are not repeated.

Furthermore, for example, in a case where a total time period of waiting is greater than a second threshold value in the waiting, execution of the performing of the second reception, the acquiring of the strength, and the comparing after the waiting may be stopped.

This stops a process of detecting an external-apparatus radio wave in a case where the total time period is greater than the second threshold value. The radar apparatus detects an object at every predetermined time interval. By the determination described above, a situation in which operation for detecting an object during a next time interval is not performed can be reduced in a case where the detection of the external-apparatus radio wave is continued.

Furthermore, for example, the method may further include storing the first reception signal obtained in the performing of the first reception, wherein in the acquiring of the strength, the strength may be acquired using the first reception signal that is stored.

This enables a signal acquired in advance to be used as the first reception signal. Therefore, of the first reception signal and the second reception signal, acquiring the second reception signal will suffice at a time of detecting an object, which enables a time taken for determining a present or an absence of the external-apparatus radio wave to be shortened.

Furthermore, for example, the first reception signal and the second reception signal may be at least one of an I signal or a Q signal.

This enables the strength of the difference signal to be calculated using at least one of the I signal and the Q signal.

Furthermore, for example, the frequency modulation is frequency modulated continuous wave (FMCW) modulation.

This enables the control method to be applied to a radar apparatus using the FMCW modulation. In addition, with the FMCW modulation, the radar apparatus can detect an object with high precision.

Furthermore, a radar apparatus according to an aspect of the present disclosure is a radar apparatus that detects an object using frequency modulation, and includes: a first receiver that receives a radio wave in a state where transmission of a radio wave for detecting the object is stopped, to obtain a first reception signal; a second receiver that receives a radio wave in the state where the transmission of the radio wave is stopped, to obtain a second reception signal, after the first receiver obtains the first reception signal; a signal strength acquirer that acquires a strength of a difference signal between the first reception signal and the second reception signal; a comparator that compares the strength with a threshold value; and a radar controller that performs control to start the transmission of the radio wave in a case where the strength is equal to or less than the threshold value in the comparison.

According to this, it is possible to realize a radar apparatus that produces the same advantageous effect as the control method.

Hereinafter, exemplary embodiments will be described in detail with reference to the drawings.

It should be noted that each of the subsequently-described exemplary embodiments shows a generic or specific example. The numerical values, shapes, materials, elements, the arrangement and connection of the elements, steps, the processing order of the steps, etc., shown in the following embodiments are mere examples, and thus are not intended to limit the claims. Furthermore, among the structural components described in the following embodiments, structural components not recited in any one of the independent claims are described as optional structural components.

Furthermore, the respective figures are not necessarily accurate illustrations. In the figures, elements which are substantially the same are given the same reference signs, and overlapping description is omitted or simplified.

Furthermore, in the Specification, terms indicating a relationship between elements such as "the same", terms indicating the shape of an element such as "straight", as well as numerical values, and numerical ranges are not only expressions with strict meanings, but also expressions whose meanings include an error of several percent, for example.

Embodiment

[1. Configuration of Radar Apparatus]

First, a configuration of radar apparatus 10 according to the present embodiment will be described with reference to FIG. 1. FIG. 1 is a block diagram illustrating the configuration of radar apparatus 10 according to the present embodiment.

Radar apparatus 10 is applicable as, for example, an object detection device installed in a vehicle (e.g., automobile). In this case, an object to be detected by radar apparatus 10 is, for example, an object present around the vehicle in question. The radar apparatus is applicable also to apparatuses other than the above apparatuses. For example, radar apparatus 10 is applicable as a user interface installed in an artificial intelligence (AI) speaker or the like. In this case, an object to be detected by the radar apparatus is, for example, a user who operates the AI speaker. With a gesture, the user can instruct the AI speaker to perform an operation of the AI speaker corresponding to the gesture. For example, the user can turn up a volume of the AI speaker with a gesture in which the user lifts up the user's left arm, and can turn down the volume of the AI speaker with a gesture in which the user put down the user's left arm.

As illustrated in FIG. 1, radar apparatus 10 includes radar sensor 100 and digital signal processor 200 (hereinafter, denoted also as DSP 200). Radar apparatus 10 according to the present embodiment switches between an object detection mode for detecting an object and a radio detection mode for receiving radio waves used by external apparatuses and the like under a predetermined condition. An object detection period, which is a period during which radar apparatus 10 operates in the object detection mode, and a radio detection period, which is a period during which radar apparatus 10 operates in the radio detection mode, are different in length from each other. Radar apparatus 10 is an apparatus that detects an object using frequency modulation. The radio waves used by the external apparatuses and the like means, for example, radio waves that interfere with a radio wave that is transmitted by radar apparatus 10 for the object detection.

Radar sensor 100 is a radio frequency (RF) unit that transmits and receives a radio wave for detecting an object and receives the radio waves used by the external apparatuses and the like. Radar sensor 100 includes PLL 110, transmitter 120, and receiver 130.

Phase locked loop (PLL) 110 generates a modulation signal (radio wave) for detecting an object based on a PLL control signal from DSP 200. PLL 110 generates the modulation signal in cooperation with, for example, a phase locked loop control circuit that performs modulating operation (chirp modulation). The modulation signal (radio wave) is, for example, a frequency modulated continuous wave (FMCW) radar signal obtained by performing frequency modulation on a continuous wave. In other words, a frequency modulation of radar apparatus 10 is FMCW modulation. PLL 110 outputs the generated radio wave to power amplifier 121 (described below) of transmitter 120 and IQ generation circuit 133 (described below) of receiver 130. With a configuration in which PLL control is applied to PLL 110, a modulation signal source for radio waves (millimeter waves) for the object detection is configured.

Transmitter 120 includes power amplifier 121 and transmission antenna 122.

Power amplifier 121 amplifies the radio wave from PLL 110.

Transmission antenna 122 transmits the radio wave from power amplifier 121 toward an object.

Receiver 130 includes reception antenna 131, low-noise amplifier 132, IQ generation circuit 133, quadrature detector 134, and AD converter 135.

Reception antenna 131 receives a reflected wave that is a radio wave reflected from an object. Reception antenna 131 also receives radio waves used by the external apparatuses and the like (also denoted as external-apparatus radio waves) during a period during which transmission antenna 122 transmits no radio wave.

Low-noise amplifier 132 amplifies the reflected waves (reflected signals) received by reception antenna 131 and the external-apparatus radio waves (interference signals) and outputs the reflected signals and the interference signals to quadrature detector 134.

IQ generation circuit 133 generates local signals of a radio wave that has a phase difference of 90° from the radio wave received from PLL 110 and outputs the local signal to quadrature detector 134.

Quadrature detector 134 performs quadrature detection on the local signals of the radio wave from IQ generation circuit 133 and the reflected waves of the radio waves amplified by low-noise amplifier 132 to generate analog IQ data on the radio waves.

In addition, quadrature detector 134 performs the quadrature detection on a leaking signal from IQ generation circuit 133 during the period during which transmission antenna 122 transmits no radio wave and on the radio waves from the external apparatuses amplified by low-noise amplifier 132 to generate analog IQ data on the external-apparatus radio waves.

AD converter 135 converts the analog IQ data on the radio waves and the analog IQ data on the external-apparatus radio waves from quadrature detector 134, into digital IQ data on the radio waves and digital IQ data on the external-apparatus radio waves, based on an input sampling clock signal. AD converter 135 outputs the digital IQ data on the reflected waves and the digital IQ data on the external-apparatus radio waves to DSP 200.

Figure 2:
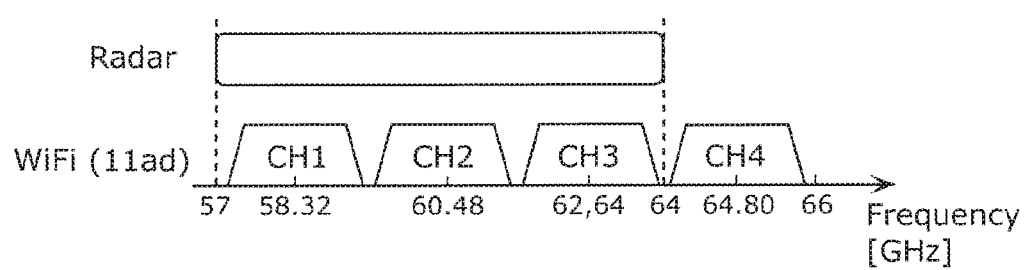
FIG. 2 is a diagram for describing an example of a frequency band of radio waves.

RF frequencies of radar sensor 100 as described above are assumed to be within a 60 GHz band. Here, frequency bands in a case where the RF frequencies of radar sensor 100 are within the 60 GHz band will be described with reference to FIG. 2. FIG. 2 is a diagram used for describing an example of a frequency band of radio waves.

As illustrated in FIG. 2, the RF frequencies within the 60 GHz band range are, for example, approximately from 57 GHz to 64 GHz. Radar sensor 100 uses a frequency band ranging approximately from 57 GHz to 64 GHz to detect an object. Radar sensor 100 in the present embodiment is a millimeter-wave sensor using millimeter waves. In addition, as illustrated in FIG. 2, the frequency band used by radar sensor 100 overlaps channels CH1 to CH3 of channels CH1 to CH4 that are used when wireless communication standard IEEE 802.11ad is used as a wireless standard of WiFi (R). That is, the radio waves used by radar sensor 100 can interfere with radio waves used by other radar sensors using the frequency band being the 60 GHz band and radio waves used by wireless communication apparatuses that communicate using channels CH1 to CH3.

The wireless communication standard IEEE 802.11ad provides a high-speed communication. Hence, it is expected that wireless communication using millimeter waves within the 60 GHz band will increase in the future. Therefore, for radar apparatus 10 using the frequency band being the 60 GHz band, it is very useful to reduce the interference particularly with the radio waves used by the wireless communication apparatus that communicates using the frequency band being the 60 GHz band from a viewpoint of improving an object detection accuracy of radar apparatus 10.

Although the frequencies used for radar sensor 100 is assumed to be within the 60 GHz band in the present embodiment, note that the frequencies are not limited to these. Any frequency band such as a 24 GHz band and a 79 GHz band can be used as long as the frequency band can be used for radar.

Referring to FIG. 1 again, DSP 200 is a controller that controls radar sensor 100. DSP 200 causes radar sensor 100 to operate in accordance with, for example, a code or hardware logic installed in advance. DSP 200 includes signal processor 210 and radar controller 220.

Signal processor 210 performs a predetermined process on the digital IQ data on the radio waves and the digital IQ data on the external-apparatus radio waves from AD converter 135 of radar sensor 100 and produces output according to a result of the process. Note that FIG. 1 illustrates a configuration for performing the predetermined process on the digital IQ data on the external-apparatus radio waves.

As illustrated in FIG. 1, signal processor 210 includes first listener 211, second listener 212, calculator 213, signal strength sensor 214, and interference detector 215. Note that the elements included in signal processor 210 may be implemented in a form of circuits (or integrated circuits). These circuits may constitute a circuit as a while or may each constitute separate circuit. These circuits may each be provided in a form of a general-purpose circuit or a dedicated circuit. Signal processor 210 may be implemented in a form of, for example, a microcomputer.

First listener 211 is a receiving device that receives first reception signal (the external-apparatus radio waves) received from AD converter 135 in first listening. First listener 211 may include a memory register that stores the received first reception signal. First listener 211 is an example of a first receiver. The first listening means stopping transmission of the radio waves and receiving the external-apparatus radio waves, which will be described below in detail.

Second listener 212 is a receiving device that receives second reception signal (the external-apparatus radio waves) received from AD converter 135 in second listening. Second listener 212 may include a memory register that stores the received second reception signal. Second listener 212 is an example of a second receiver. The second listening is performed after the first listening and, as with the first listening, means stopping transmission of the radio waves and receiving the external-apparatus radio waves.

Calculator 213 performs a predetermined calculation on the first reception signal from first listener 211 and the second reception signal from second listener 212 and outputs a result of the calculation to signal strength sensor 214. In the present embodiment, calculator 213 is a difference calculator (subtractor) that calculates a difference between the first reception signal and the second reception signal to generate a difference signal. Calculator 213 outputs the generated difference signal to signal strength sensor 214. Calculator 213 may be a ratio calculator (divider) that calculates a ratio between the first reception signal and the second reception signal to generate a ratio signal.

Signal strength sensor 214 senses a strength of the difference signal from calculator 213 by calculating the strength based on the difference signal. Signal strength sensor 214 may calculate the strength of the difference signal (e.g., a power spectrum) by performing the Fast Fourier Transform (FFT) processing or based on a statistics on the difference signal. As the strength of the difference signal based on the statistics, signal strength sensor 214 may calculate, for example, a maximum value, a minimum value, a mean value, or a median of the signal strengths of the difference signal, or a root means square (RMS) value obtained by performing the RMS processing on the signal strengths. Signal strength sensor 214 may calculate the strength based on a difference in received signal strength indication (RSSI) (difference signal).

Interference detector 215 detects whether any radio wave from an external apparatus is present in the frequency band used by radar apparatus 10 based on the strength of the difference signal and a first threshold value (threshold value) that is specified in advance. For example, interference detector 215 compares the strength of the difference signal and the first threshold value, and detects that no radio wave from an external apparatus is present in a case where the strength of the difference signal is less than the first threshold value. Interference detector 215 then outputs a mode switching signal that is a control signal for controlling radar controller 220. The mode switching signal is a signal for switching from the radio detection mode to the object detection mode. In a case where, for example, a result of the detection indicates that no external-apparatus radio wave is present, interference detector 215 outputs the mode switching signal for switching from the radio detection mode to the object detection mode.

Interference detector 215 compares the strength of the difference signal and the first threshold value, and detects that some radio wave from an external apparatus is present in a case where the strength of the difference signal is not less than the first threshold value. In this case, interference detector 215 does not output the mode switching signal. For example, interference detector 215 may output a signal indicating that the radio detection mode is to continue to radar controller 220. The first threshold value is a threshold value of the signal strength used for determining whether interference will occur.

Radar controller 220 is a control device that controls operation of radar sensor 100. Radar controller 220 performs control to switch radar sensor 100 from the radio detection mode to the object detection mode based on the mode switching signal from signal processor 210. In the radio detection mode, radar controller 220 generates a reception control signal for controlling the elements of radar sensor 100 in the radio detection mode. Radar controller 220 outputs the generated reception control signal to radar sensor 100. In the object detection mode, radar controller 220 generates the PLL control signal for causing PLL 110 to perform the modulating operation, and a transmission control signal and a reception control signal for controlling the elements of radar sensor 100 in the object detection mode. Radar controller 220 outputs the generated PLL control signal to PLL 110 of radar sensor 100, and outputs the generated transmission control signal and reception control signal to radar sensor 100.

In addition, radar controller 220 may output, to radar sensor 100, an intermittent control signal for turning on/off the operation of radar sensor 100 for achieving low power consumption.

Radar controller 220 may be implemented in a form of, for example, a microcomputer. In a case where signal processor 210 is implemented in the form of a microcomputer, signal processor 210 and radar controller 220 may be implemented in a form of a microcomputer or in a form of separate microcomputers.

[2. Operation of Radar Apparatus]

Figure 3:
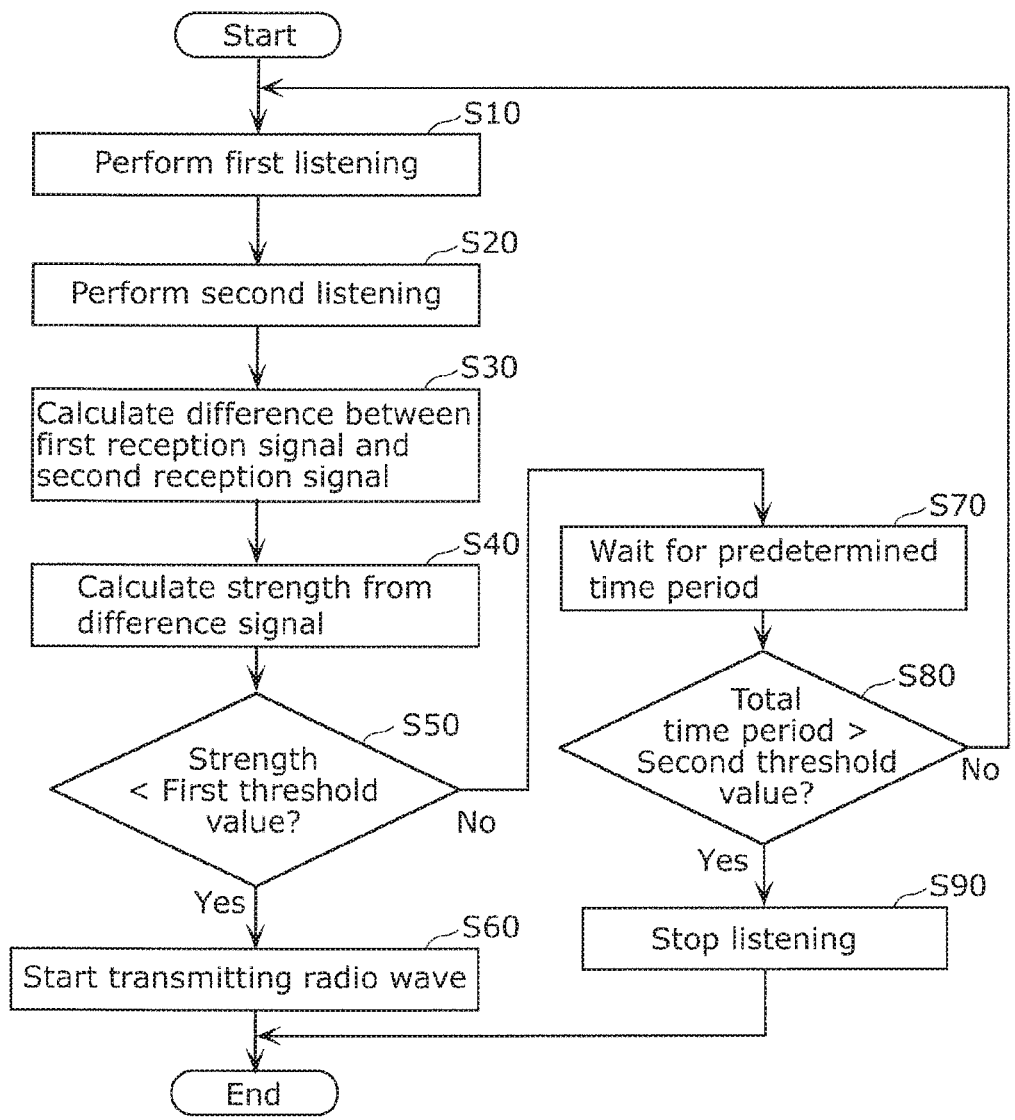
FIG. 3 is a flowchart illustrating operation of the radar apparatus according to the embodiment.

Next, operation of radar apparatus 10 that detects an object using the frequency modulation described above will be described with reference to FIG. 3 to FIG. 8. FIG. 3 is a flowchart illustrating the operation of radar apparatus 10 according to the present embodiment. Steps S10 to S50, S70, and S80 illustrated in FIG. 3 are operations performed before radar apparatus 10 detects an object and illustrate operation in the radio detection mode.

As illustrated in FIG. 3, radar apparatus 10 first performs the first listening (S10). The first listening means an operation to receive radio waves in a state where transmission antenna 122 transmits no radio wave (e.g., transmission of radio waves for detecting an object is stopped) to obtain the first reception signal via reception antenna 131. In the first listening, in the above state for example, reception antenna 131 performs sensing to detect whether a radio wave (signal) from an external apparatus is present within the frequency band used by radar apparatus 10. In the first listening, the signal received by reception antenna 131 and output from quadrature detector 134 is converted into digital IQ data by AD converter 135 and output to first listener 211 as a first reception signal. First listener 211 can thus obtain the first reception signal. First listener 211 may store the obtained digital IQ data in the memory register. Step S10 is an example of a first reception step.

In the first listening, reception antenna 131 receives external-apparatus radio waves, for example, while changing a reception frequency. Specifically, in the first listening, reception antenna 131 receives the radio waves within a reception frequency band (an example of a first reception frequency band) that is specified in accordance with the frequency band within which a radio wave for detecting an object is used (in the present embodiment, this is the 60 GHz band and an example of the frequency band used in the frequency modulation). That is, in the first listening, the radio waves are received while the reception frequency is being changed.

Figure 4:
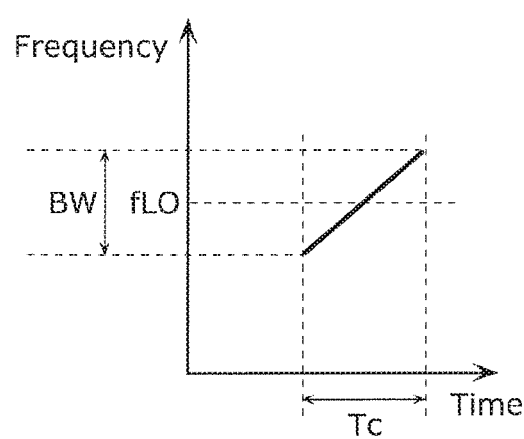
FIG. 4 is a diagram illustrating an example of a change in a reception frequency during reception by the radar apparatus according to the embodiment.

In the first listening, reception antenna 131 may change the reception frequency in accordance with, for example, frequency modulation in the object detection mode. In a case where the frequency modulation in the object detection mode is the FMCW modulation, the reception frequency may be changed continuously in accordance with the FMCW modulation. For example, as illustrated in FIG. 4, the reception frequency may be a frequency that is continuously changed by modulation frequency band BW in a straight line pattern for sensing period Tc (a sweep period in the reception). In FIG. 4, fLO indicates a center frequency of the reception frequency. Although there are no specific limitations imposed on sensing period Tc, modulation frequency band BW, and center frequency fLO, for example, sensing period Tc is set as Tc=22 μsec, modulation frequency band BW is set as BW=6 GHz, and center frequency fLO is set as fLO=60 GHz. FIG. 4 is a diagram illustrating an example of how the reception frequency changes while radar apparatus 10 according to the present embodiment performs the reception.

Note that the frequency modulation is not limited to the FMCW modulation and may be the Frequency Shift Keying CW (FSKCW) modulation, which uses a plurality of continuous waves (CWs) in combination. In this case, the reception frequency is profiled in a step-like shape frequency profile (including a plurality of frequencies separate from each other). Description will be given below of a case where the frequency modulation is the FMCW modulation.

The signal received in the first listening is an example of the first reception signal. The first reception signal is at least one of an I signal and a Q signal.

Figure 5A:
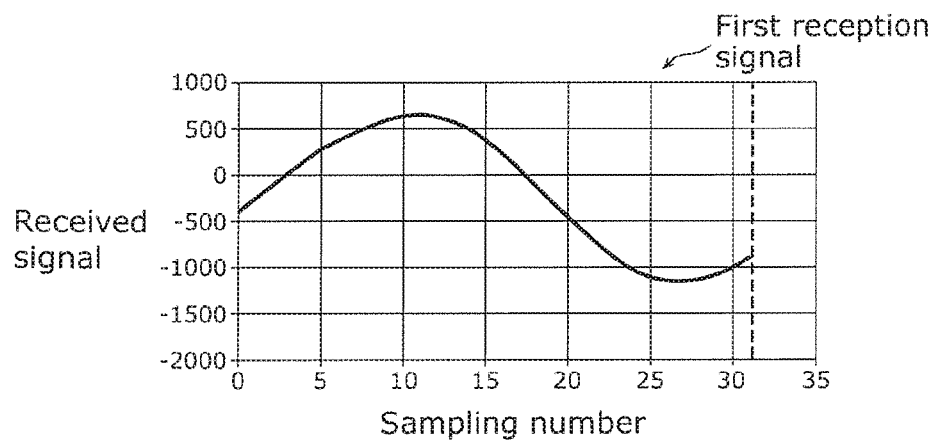
FIG. 5A is a graph illustrating an example of a first reception signal in the case where an external-apparatus radio wave is not received.
Figure 6A:
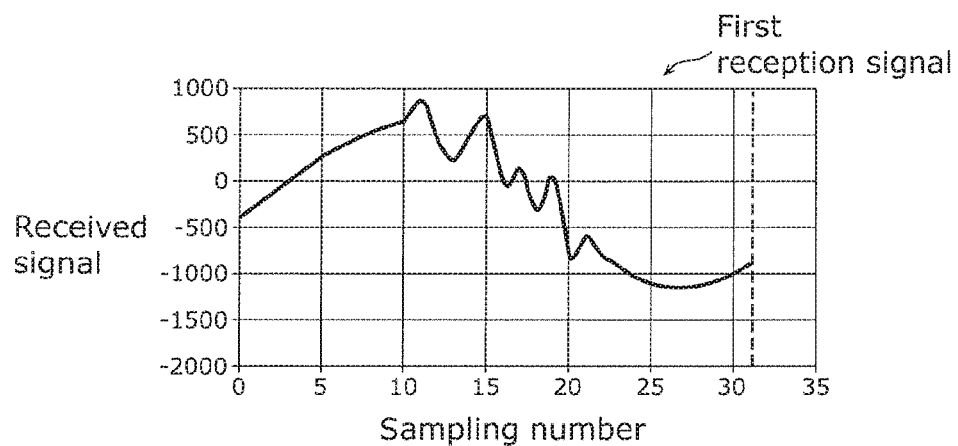
FIG. 6A is a graph illustrating an example of the first reception signal in the case where the external-apparatus radio wave is received.

Here, in the first listening, the first reception signal in a case where the external-apparatus radio wave (signal) is received and the first reception signal in a case where the external-apparatus radio wave is not received will be described with reference to FIG. 5A and FIG. 6A. FIG. 5A is a graph illustrating an example of the first reception signal in the case where the external-apparatus radio wave is not received. FIG. 6A is a graph illustrating an example of the first reception signal in the case where the external-apparatus radio wave is received. In FIG. 5A and FIG. 6A, their ordinates indicate values of the received reception signals, and their abscissae indicate sampling numbers. These graphs illustrate results of samplings that are performed 32 times for sensing period Tc=22 μsec within modulation frequency band BW=6 GHz at and around center frequency fLO=60 GHz. Assuming that the reception frequency is changed to continuously, monotonously increase by modulation frequency band BW, a reception signal at a sampling number "0" indicates a result at a time when the reception frequency is its minimum, and a reception signal at a sampling number "31" (see a broken line) indicates a result at a time when the reception frequency is its maximum. FIG. 5A and FIG. 6A illustrate signals (digital signals) acquired by first listener 211.

As illustrated in FIG. 5A, even in a case where no other apparatuses transmit radio waves, a signal appearing to be indicative that reception antenna 131 has received some radio wave is detected. This signal is noise caused by a leakage of a signal from PLL 110 to at least one of transmitter 120 and receiver 130 even in a case where no radio wave is transmitted from transmission antenna 122. That is, the signal illustrated in FIG. 5A indicates noise.

Radar apparatus 10 detects external-apparatus radio waves using the frequency modulation. Therefore, a frequency and a quantity of the signal that leaks from PLL 110 to at least one of transmitter 120 and receiver 130 are not constant and changes with or in accordance with time. In the present embodiment, this causes a signal strength of the noise changes with time as illustrated in FIG. 5A. In a case where the signal leaks from PLL 110 to transmitter 120, the noise changes in accordance with an external environment of radar apparatus 10 (e.g., temperature, a position of an object, etc.).

In a case where the received signal illustrated in FIG. 5A is used to determine whether the frequency band used by radar apparatus 10 is used by an external apparatus, it is difficult to make the determination correctly. For example, at and around a sampling number of 10 (at and around a reception frequency of 60 GHz), the signal strength of the noise is high, which may result in a misdetection indicating that a frequency at or around 60 GHz is used. It is therefore desired to remove such noise, but it is not easy to remove such noise that changes with time.

As used herein, the term "noise" means a signal that is acquired based on, as described above, a leakage from at least one of PLL 110 and IQ generation circuit 133 in a state where transmission antenna 122 transmits no radio wave (e.g., see FIG. 5A). The noise includes one produced by reception antenna 131 receiving a reflected wave that is a signal leaking to transmitter 120 from at least one of PLL 110 and IQ generation circuit 133, transmitted from transmission antenna 122, and reflected from an object. The noise also includes one produced by quadrature detector 134 (specifically, mixer) receiving a signal leaking to receiver 130 from at least one of PLL 110 and IQ generation circuit 133.

As illustrated in FIG. 6A, in a case where another apparatus uses channel CH2 (corresponding to sampling numbers 11 to 21 in FIG. 6A), signal strengths at the sampling numbers corresponding to channel CH2 show irregular fluctuations. This irregularity is attributable to inconstancy in information communicated in CH2 and the modulation (OFDM, etc.). However, the noise illustrated in FIG. 5A is also received, and thus, as in FIG. 5A, in a case where the received signal illustrated in FIG. 6A is used to determine whether the frequency band used by radar apparatus 10 is used by an external apparatus, it is difficult to make the determination correctly.

Hence, as illustrated in FIG. 3, radar apparatus 10 according to the present embodiment performs, after the first listening, second listening (S20). The second listening means an operation to receive radio waves in a state where transmission antenna 122 transmits no radio wave (e.g., transmission of radio waves for detecting an object is stopped) to obtain the second reception signal. In the second listening, in the above state for example, reception antenna 131 performs sensing to detect whether a radio wave (signal) from an external apparatus is present within the frequency band used by radar apparatus 10. In the second listening, in the above state for example, reception antenna 131 senses whether a radio wave (signal) from an external apparatus is present at a wireless frequency used by radar apparatus 10. In the second listening, the signal received by reception antenna 131 and output from quadrature detector 134 is converted into digital IQ data by AD converter 135 and output to second listener 212 as a second reception signal. Second listener 212 can thus obtain the second reception signal. Second listener 212 may store the obtained digital IQ data in the memory register. Step S20 is an example of a second reception step.

In the second listening, reception antenna 131 receives a radio wave of the external apparatus, for example, while changing a reception frequency. Specifically, in the second listening, reception antenna 131 receives the radio waves within a reception frequency band (an example of a second reception frequency band) that is specified in accordance with the frequency band within which a radio wave for detecting an object is used (in the present embodiment, this is the 60 GHz band and an example of the frequency band used in the frequency modulation). That is, in the second listening, the radio waves are received while the reception frequency is being changed.

In step S20, the second reception frequency band that is set for receiving radio waves includes the first reception frequency band that is set for receiving the radio waves in step S10. For example, the reception of radio waves may be performed with the first reception frequency band and the second reception frequency band set as the same frequency band.

In the second listening, reception antenna 131 may change the reception frequency in accordance with, for example, frequency modulation in the object detection mode. As illustrated in FIG. 4, the reception frequency may be continuously changed by modulation frequency band BW for sensing period Tc (the sweep period in the reception). Sensing period Tc, modulation frequency band BW, and center frequency fLO are the same as those used in the first listening but, for example, may differ from those used in the first listening.

The signal received in the second listening is an example of the second reception signal. The second reception signal is at least one of an I signal and a Q signal.

Figure 5B:
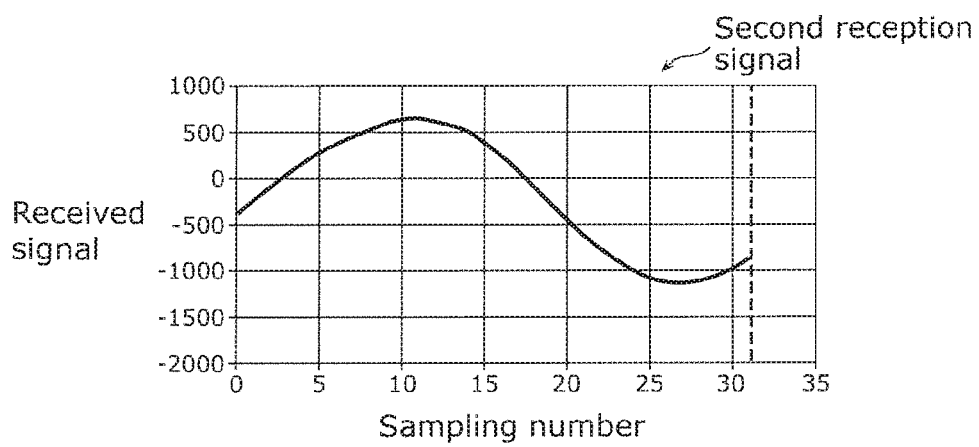
FIG. 5B is a graph illustrating an example of a second reception signal in the case where the external-apparatus radio wave is not received.
Figure 6B:
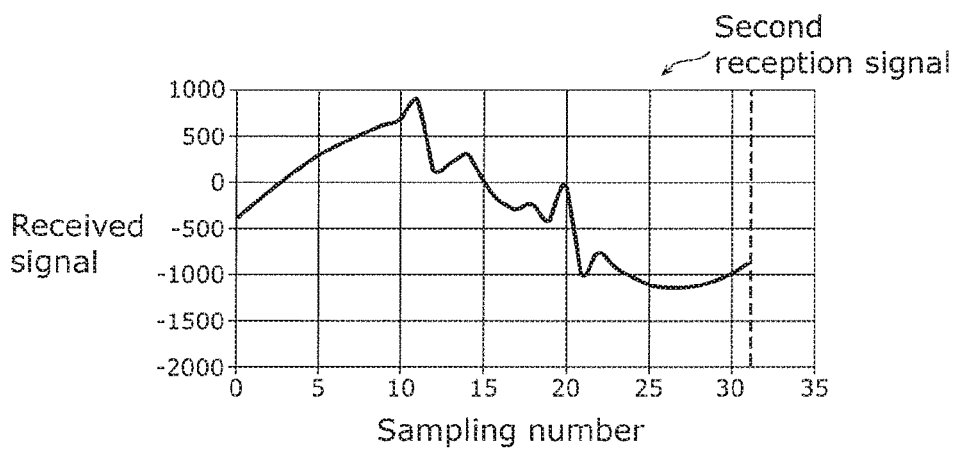
FIG. 6B is a graph illustrating an example of the second reception signal in the case where the external-apparatus radio wave is received.

Here, in the second listening, the second reception signal in a case where the external-apparatus radio wave (signal) is received and the second reception signal in a case where the external-apparatus radio wave is not received will be described with reference to FIG. 5B and FIG. 6B. FIG. 5B is a graph illustrating an example of the second reception signal in the case where the external-apparatus radio wave is not received. FIG. 6B is a graph illustrating an example of the second reception signal in the case where the external-apparatus radio wave is received. FIG. 5B and FIG. 6B illustrate signals acquired by second listener 212. In FIG. 5B and FIG. 6B, their ordinates indicate values of the received reception signals, and their abscissae indicate sampling numbers.

As illustrated in FIG. 5B, even in a case where no other apparatuses transmit radio waves, a signal appearing to be indicative that reception antenna 131 has received some radio wave is detected. This signal is also noise as in FIG. 5A. For example, in a case where a time interval between the first listening and the second listening is short (e.g., within 1 sec), the noises illustrated in FIG. 5A and FIG. 5B are substantially the same. This is because a short time interval is considered not to significantly change the quantity of the signal that leaks from PLL 110 to at least one of transmitter 120 and receiver 130, and the external environment of radar apparatus 10.

As illustrated in FIG. 6B, in a case where another apparatus uses channel CH2 (corresponding to sampling numbers 11 to 21 in FIG. 6B), signal strengths at the sampling numbers corresponding to channel CH2 show irregular fluctuations. At that point, the signals at the sampling numbers 11 to 21 corresponding to channel CH2 are different from signals at the sampling numbers 11 to 21 illustrated in FIG. 5B. This is because pieces of information or the like transmitted in the first listening and the second listening are different from each other even in a case where the same channel CH2 is used by the external apparatus in the first listening and the second listening.

Referring to FIG. 3 again, radar apparatus 10 then calculates a difference between the first reception signal and the second reception signal (S30). Specifically, calculator 213 acquires the first reception signal from first listener 211 and acquires the second reception signal from second listener 212. Calculator 213 then generates a difference signal that indicates the difference between the first reception signal and the second reception signal. Calculator 213 outputs the generated difference signal to signal strength sensor 214. Step S30 is an example of a strength acquisition step.

Signal strength sensor 214 senses a strength of the difference signal (signal strength) based on the acquired difference signal (S40). As a method for calculating the strength of the difference signal by signal strength sensor 214, any one of the methods described above is employed. The following description will be given of an example in which signal strength sensor 214 calculates a root mean square (RMS) value as the strength of the difference signal. Step S40 is an example of the strength acquisition step.

Figure 5C:
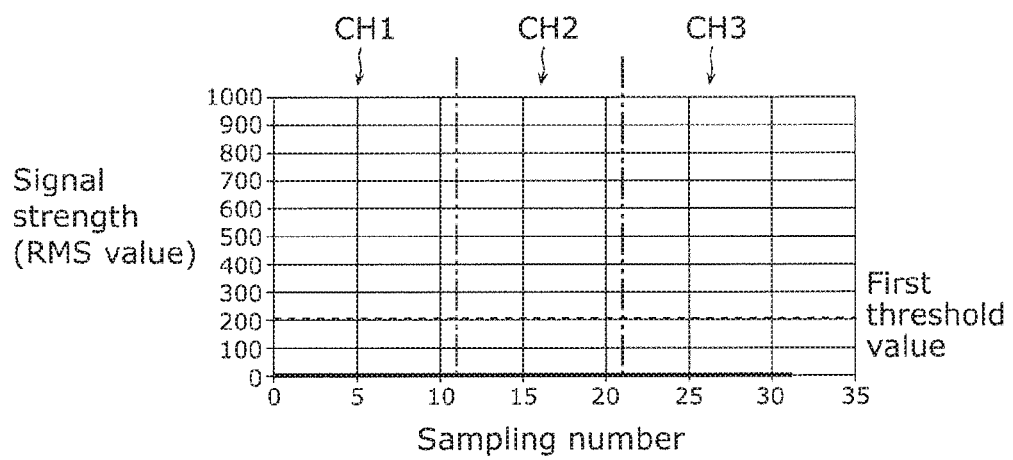
FIG. 5C is a graph illustrating an example of the strength of a difference signal in the case where the external-apparatus radio wave is not received.
Figure 6C:
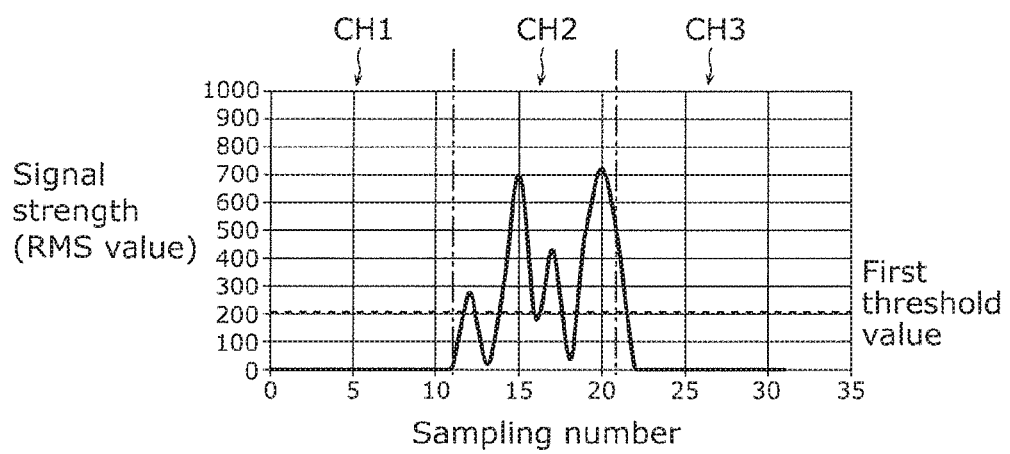
FIG. 6C is a graph illustrating an example of the strength of a difference signal in the case where the external-apparatus radio wave is received.

The strength of the difference signal calculated by signal strength sensor 214 will be described with reference to FIG. 5C and FIG. 6C. FIG. 5C is a graph illustrating an example of the strength of the difference signal in the case where the external-apparatus radio wave is not received. FIG. 6C is a graph illustrating an example of the strength of the difference signal in the case where the external-apparatus radio wave is received. In FIG. 5C and FIG. 6C, their ordinates indicate the signal strengths (RMS value) of the difference signals, and their abscissae indicate sampling numbers. The strengths illustrated in FIG. 5C and FIG. 6C indicate RMS values of the difference signals in channels CH1 to CH3.

As illustrated in FIG. 5C, in the case where no radio wave from another apparatus is received, the strength of the difference signal is substantially zero over channels CH1 to CH3, respectively. Since the noise undergoes substantially no change as illustrated in FIG. 5A and FIG. 5B, a strength of a signal from which the noise is removed (e.g. the difference signal) can be acquired by calculating the difference.

As illustrated in FIG. 6C, in the case where a radio wave from another apparatus is received, the strength of the difference signal is substantially zero except for channel CH2. In addition, the strength takes large values within a frequency band of channel CH2 (at sampling numbers corresponding to channel CH2 in FIG. 6C). FIG. 6C illustrates exclusively a strength of a radio wave within the frequency band used by the external apparatus, from which the noise is removed. In other words, by taking a difference between two received signals different in acquired time, as illustrated in FIG. 6A and FIG. 6B, radar apparatus 10 removes exclusively the noise from the radio wave from the other apparatus and the noise included in the two received signals, so as to acquire the strength of the radio wave from the other apparatus.

Signal strength sensor 214 outputs the sensed strength of the difference signal to interference detector 215.

In step S40, signal strength sensor 214 may calculate a strength of a difference signal based on a stored first reception signal and a second reception signal that is currently acquired by second listener 212. That is, signal strength sensor 214 may use the stored first reception signal (e.g., a received signal acquired in advance) to acquire the signal strength. In this case, in step S30, calculator 213 calculates the difference signal based on the stored first reception signal and the second reception signal currently acquired by second listener 212.

The stored first reception signal is a signal that is acquired in advance via reception antenna 131 and stored in the memory register of first listener 211. In a case where the stored first reception signal is used, the first listening (S10) and the second listening (S20) may be performed with a time interval therebetween. In addition, between step S10 (the first listening) and step S20 (the second listening), a storage step of storing the first reception signal acquired in the first listening may be included.

Referring to FIG. 3 again, interference detector 215 compares the strength of the difference signal acquired from signal strength sensor 214 with the first threshold value (S50). Interference detector 215 has a function of, for example, determining whether a strength (e.g., the signal strengths illustrated in FIG. 5C and FIG. 6C) is less than the first threshold value. The first threshold value is stored in advance in, for example, a storage (not illustrated) included in DSP 200. Step S50 is an example of a comparison step.

In the present embodiment, interference detector 215 compares the strength of the RMS with the first threshold value to make the determination described above. When determining that the strength is less than the first threshold value (Yes in S50), interference detector 215 outputs the mode switching signal for switching from the radio detection mode to the object detection mode to radar controller 220. In a case of Yes in step S50, that is, in a case where the external apparatus uses no radio wave within the frequency band used by radar apparatus 10, interference detector 215 causes radar sensor 100 to detect an object because a risk of an interference or the like occurring when a radio wave for detecting an object is transmitted is low.

Upon acquiring the mode switching signal from interference detector 215, radar controller 220 switches an operation mode of radar apparatus 10 from the radio detection mode to the object detection mode. That is, radar controller 220 causes radar sensor 100 to start the transmission of the radio wave for detecting an object in the case where the strength is less than the first threshold value (S60). That is, radar apparatus 10 starts detecting an object. Step S60 is an example of a transmission start step.

In a case where interference detector 215 determines that the strength is not less than the first threshold value (No in S50), radar apparatus 10 waits for a predetermined time period (S70). The waiting means that the detection of an object in the object detection mode and the detection of a radio wave from an external apparatus in the radio detection mode are not performed.

After the predetermined time period has elapsed, radar controller 220 determines whether a total time period, which is a total of time periods of waiting, is greater than a second threshold value (S80). In a case where the total time period is not greater than the second threshold value (No in S80), radar controller 220 returns to step S10 to perform step S10 to S50 and its subsequent processes again. Radar controller 220 repeats the processes until the total time period becomes greater than the second threshold value.

In a case where the total time period is greater than the second threshold value (Yes in S80), radar controller 220 stops the listening (S90). Specifically, after step S80, radar controller 220 does not perform the processes from step S10. As seen from the above, in the case where the total time period of waiting is greater than the second threshold value, radar controller 220 stops performing the processes of step S10 to S50 after step S70. Radar apparatus 10 then terminates the operation in the radio detection mode. At that point, for example, the detection of an object may not be performed. Here, the second threshold value is a threshold value used for determining the time period. The second threshold value is stored in advance in, for example, the storage (not illustrated) included in DSP 200.

The processes described above are performed, for example, every time before performing detection of an object. For example, radar apparatus 10 detects an object at every predetermined time period (e.g., 1 msec). The predetermined time period in step S70 is a time period shorter than the predetermined time period. For example, the predetermined time period is determined based on the predetermined period and a time period taken for the processes of step S10 to S50. For example, the predetermined time period is determined based on the predetermined period and a time period for which radar apparatus 10 operates as a radar.

Note that at least some of the processes illustrated in FIG. 3 may not be performed. For example, step S70 may not be performed.

The above description is given of the example in which the first reception signal and the second reception signal are both signals based on radio waves received at one of a time when the other apparatus transmits a radio wave and a time when the other apparatus transmits no radio wave, but the present disclosure is not limited to this. It is possible that one of the first reception signal and the second reception signal is a signal based on a radio wave received at the time when the other apparatus transmits the radio wave, and the other of the first reception signal and the second reception signal is a signal based on a radio wave received at the time when the other apparatus transmits no radio wave. In other words, it is possible that the first listening is performed at one of the time when the other apparatus transmits the radio wave and the time when the other apparatus transmits no radio wave, and the second listening is performed at the other of the time when the other apparatus transmits the radio wave and the time when the other apparatus transmits no radio wave.

A difference signal in such a case is calculated, for example, from a difference between the first reception signal illustrated in FIG. 5A and the second reception signal illustrated in FIG. 6B or between the first reception signal illustrated in FIG. 6A and the second reception signal illustrated in FIG. 5B. A strength of the difference signal exceeds the first threshold value (S50 is determined to be No), and thus the transmission of the radio wave is not started in this case. The first threshold value is to be a strength lower than the strength of the difference signal.

Figure 7:
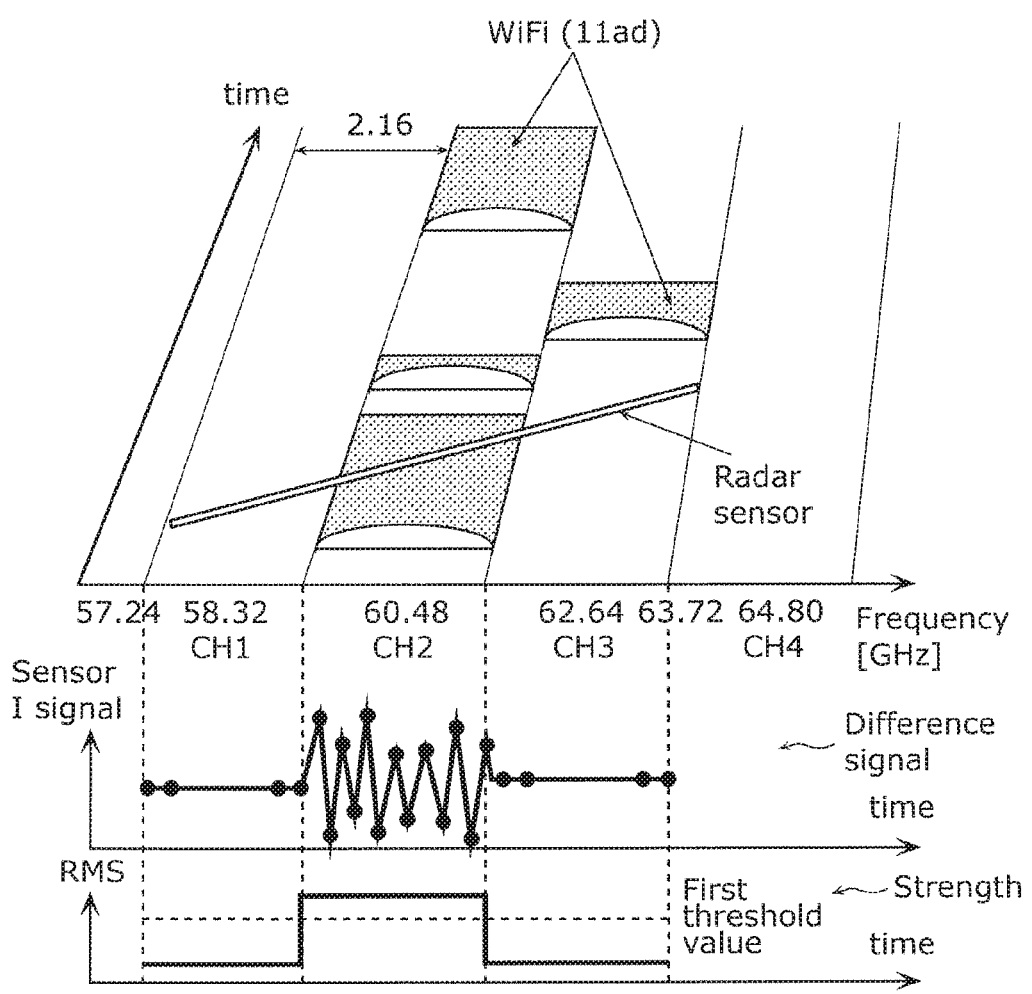
FIG. 7 is a diagram for describing an example of a reception operation when the radar apparatus according to the embodiment receives radio waves in a plurality of channels.
Figure 8:
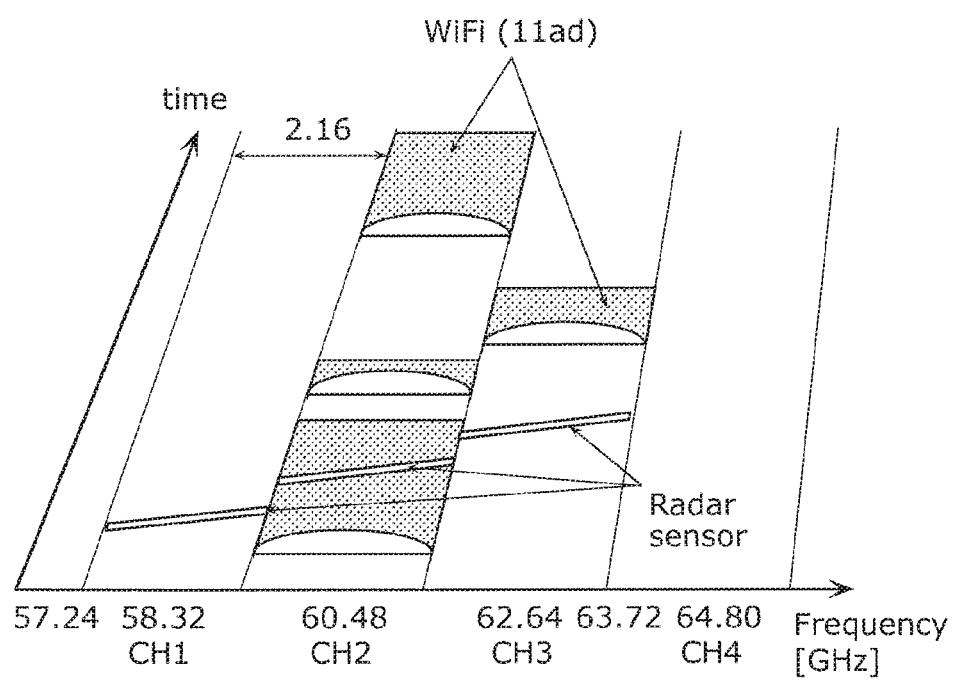
FIG. 8 is a diagram for describing another example of the reception operation when the radar apparatus according to the embodiment receives the radio waves in the plurality of channels.

Here, the processes of step S10 to S50 will be further described with reference to FIG. 7 and FIG. 8. FIG. 7 is a diagram used for describing an example of a reception operation when radar apparatus 10 according to the present embodiment receives radio waves in a plurality of channels. FIG. 8 is a diagram used for describing another example of the reception operation when radar apparatus 10 according to the present embodiment receives the radio waves in the plurality of channels. FIG. 7 and FIG. 8 each illustrate a case where the first reception frequency band and the second reception frequency band includes channels CH1 to CH3 (an example of the plurality of channels).

As illustrated in FIG. 7, radar sensor 100 may acquire channels CH1 to CH3 with one reception operation. That is, radar sensor 100 may receive radio waves within a frequency band including channels CH1 to CH3, as the reception frequency in steps S10 and S20. In steps S10 and S20, reception antenna 131 may receive the radio waves within a reception frequency band including frequency bands of channels CH1 to CH3. In addition, radar sensor 100 may perform the reception operation in a part of the frequency band of each CH.

In step S30, calculator 213 calculates a difference signal illustrated in FIG. 7, which is a difference signal covering the frequency bands of channels CH1 to CH3. Note that the difference signal in FIG. 7 indicates a difference signal of an I signal, as an example.

In step S40, signal strength sensor 214 calculates a strength of the difference signal illustrated in FIG. 7, which is a strength of the difference signal covering the frequency bands of the channels CH1 to CH3. Note that the signal strength illustrated in FIG. 7 indicates an RMS strength, as an example.

In step S50, interference detector 215 compares the strength of the difference signal covering the frequency bands of channels CH1 to CH3 with the first threshold value. This enables step S50 to be determined to be No in a case where any one of channels CH1 to CH3 is used.

Alternatively, as illustrated in FIG. 8, radar sensor 100 may receive radio waves within a frequency band including at least one of channels CH1 to CH3, as the reception frequency in steps S10 and S20. FIG. 8 illustrates an example in which channels CH1 to CH3 are listened at different timings. In this case, the processes of steps S10 to S50 are performed for each of channels CH1 to CH3, for example. For example, the determination in step S50 is performed for each of channels CH1 to CH3.

Then, for example, in a case where step S50 results in Yes in at least one of channels CH1 to CH3, the operation of radar apparatus 10 proceeds to step S60, and in a case where step S50 results in No in all of channels CH1 to CH3, the operation of radar apparatus 10 proceeds to step S70.

This enables a channel that is not used by the external apparatus of channels CH1 to CH3 to be identified. In a case where, for example, there is a channel that is not used by the external apparatus of channels CH1 to CH3, radar apparatus 10 can detect an object using the channel.

In a case where step S50 is determined to be No in at least one of channels CH1 to CH3, the operation of radar apparatus 10 may proceed to step S70 at a time when step S50 is determined to be No. This enables the processes of steps S10 to S50 to become faster.

[3. Advantageous Effects]

As described above, the two listenings are performed in the radio detection mode to determine whether there is a possibility of interference. Specifically, the first listening (S10) and the second listening (S20) after the first listening are performed. Whether there is a possibility of interference is then determined based on the difference signal between the first reception signal acquired in the first listening and the second reception signal acquired in the second listening.

Even in a case where radar apparatus 10 is a radar apparatus that detects an object using the frequency modulation, and the received signals in the listenings include noise that is caused by the frequency modulation and has a strength that changes with time, this can remove the noise. Therefore, whether there is a possibility of interference can be determined correctly.

Other Embodiments

Although the method for controlling radar apparatus 10 and radar apparatus 10 according to one or more aspects of the present disclosure have been described above based on the foregoing embodiment, the present disclosure is not limited to the foregoing embodiment. The one or more aspects may thus include forms obtained by making various modifications to the embodiment that can be conceived by those skilled in the art, as well as forms obtained by combining elements in the foregoing embodiment, without materially departing from the essence of the present disclosure.

For example, the embodiment described above is given of an example in which sensing period Tc is common to the first listening and the second listening, but sensing period Tc may differ for each of the first listening and the second listening.

The embodiment described above is given of an example in which the signal strength of the received signal is a relative value, but the present disclosure is not limited to this. For example, the signal strength may be an absolute value.

The embodiment described above is given of an example in which the control method is applied to radar apparatus 10 that detects an object using the frequency modulation, but the present disclosure is not limited to this. For example, the control method may be applied to a radar apparatus that detects an object using a fixed frequency.

In addition, in the embodiment described above, whether the total time period is greater than the second threshold value is determined in step S80 illustrated in FIG. 3, but the present disclosure is not limited to this. For example, in step S80, a number of times of performing step S70 (a number of times of waiting for the predetermined time period) may be compared with the second threshold value, and in a case where the number of times is greater than the second threshold value, the operation of radar apparatus 10 may proceeds to step S90. Here, the second threshold value is a threshold value for determining the number of times.

In addition, the embodiment described above is given of an example in which steps S10 to S50 are performed again in a case where step S80 illustrated in FIG. 3 is determined to be No, but the present disclosure is not limited to this. For example, in a case where step S80 illustrated in FIG. 3 is determined to be No, step S10 may not be performed, and the processes from steps S20 to S50 may be performed. In this case, one of the first reception signal and the second reception signal that are received before step S50 is determined to be No may be used as the first reception signal. The signal is stored in, for example, the memory register of first listener 211 or second listener 212. Note that, in a case where step S80 illustrated in FIG. 3 is determined to be No, at least step S20 of steps S10 and S20 is performed.

In addition, in steps S10 and S20 illustrated in FIG. 3 in the embodiment described above, the radio wave may be received by changing the reception frequency from a low frequency to a high frequency (e.g., by changing the reception frequency continuously from the low frequency to the high frequency in a case where the frequency modulation of radar apparatus 10 is the FMCW modulation) or by changing the reception frequency from the high frequency to the low frequency (e.g., by changing the reception frequency continuously from the high frequency to the low frequency in the case where the frequency modulation of radar apparatus 10 is the FMCW modulation).

In the embodiment described above, the plurality of CHs are listened, and the listening is performed again in a case where an interference is detected in some signal band (e.g., CH2), but the present disclosure is not limited to this operation. In a case where vacant CHs (e.g., CH1 and CH3) are detected, the transmission of the radio wave may be started within frequency ranges of the vacant CHs.

Although the wireless communication apparatus is assumed to confirm to IEEE 802.11ad, but the present disclosure is not limited to this. The present disclosure is applicable to any wireless communication apparatus that uses the same frequency band. In this case, although a condition of CH and the frequencies differ, the same advantageous effects are provided.

Furthermore, some or all elements included in radar apparatus 10 may be implemented a single system large scale integration (LSI).

The system LSI is a super multifunctional LSI manufactured by integrating a plurality of elements onto a single chip. More specifically, the system LSI is a computer system configured to include (a) a DSP or microprocessor, (b) a read-only memory (ROM), (c) a random-access memory (RAM), or the like. The ROM stores a program. The DSP or the microprocessor operates according to the program so that a function of the LSI is achieved.

Although the integrated circuit implementing these elements is referred to as a system LSI here, the integrated circuit may be referred to as an IC, an LSI, a super LSI, or an ultra LSI depending on the scale of integration. Moreover, the method of implementation of the elements using an integrated circuit is not limited to application of an LSI, and the elements may be implemented by a dedicated circuit or a general-purpose processor. It is also possible to use a field programmable gate array (FPGA) that can be programmed after being manufactured, or a reconfigurable processor in which connection and setting of circuit cells in an LSI can be reconfigured.

Furthermore, when a circuit integration technology that replaces LSIs comes along owing to advances of the semiconductor technology or to a separate derivative technology, the function blocks may understandably be integrated using that technology. There can be a possibility of adaptation of biotechnology, and so on.

Furthermore, the elements included in radar apparatus 10 in the respective embodiments may be included by being dispersed among a plurality of devices connected via a communication network.

Furthermore, an aspect of the present disclosure may be implemented not only as above-described radar apparatus 10, but also as a method for controlling radar apparatus 10, which includes the characteristic elements included in radar apparatus 10 as steps. Furthermore, an aspect of the present disclosure may be a program that causes a computer to execute the characteristic steps included in the method for controlling radar apparatus 10. Furthermore, an aspect of the present disclosure may be a non-transitory computer-readable recording medium on which such a computer program is recorded.

It should be noted that each of the elements of radar apparatus 10 in each of the embodiments above may be configured in the form of an exclusive hardware product, or may be realized by executing a software program suitable for the element. Each of the elements may be realized by means of a program executer, such as a central processing unit (CPU) or a processor, reading and executing the software program recorded on a recording medium such as a hard disk or a semiconductor memory.

INDUSTRIAL APPLICABILITY

The method for controlling a radar apparatus, etc., according to an aspect of the present disclosure can be applied to an object detection device installed in a vehicle, for example.

The invention claimed is:

1. A method for controlling a radar apparatus that detects an object using frequency modulation, the method comprising:
   performing first reception of a radio wave in a state where transmission of a radio wave for detecting the object is stopped, to obtain a first reception signal;
   performing second reception of a radio wave in a state where the transmission of the radio wave is stopped, to obtain a second reception signal, immediately after the performing of the first reception;
   acquiring a strength of a difference signal between the first reception signal and the second reception signal;
   comparing the strength with a first threshold value; and
   starting the transmission of the radio wave based on a result of the comparison of the strength and the first threshold value.

2. The method for controlling a radar apparatus according to claim 1, wherein
   in the performing of the first reception, the radio wave is received in a first reception frequency band that is specified in accordance with a frequency band used in the frequency modulation, and
   in the performing of the second reception, the radio wave is received in a second reception frequency band that is specified in accordance with a frequency band used in the frequency modulation.

3. The method for controlling a radar apparatus according to claim 2, wherein the first reception frequency band and the second reception frequency band are a same frequency band.

4. The method for controlling a radar apparatus according to claim 3, wherein
   the first reception frequency band and the second reception frequency band each include a plurality of channels, and
   in the comparing, comparison is performed in each of the plurality of channels.

5. The method for controlling a radar apparatus according to claim 1, further comprising:
   waiting for a predetermined time period in a case where the strength is greater than the first threshold value in the comparing, wherein
   the performing of the second reception, the acquiring of the strength, and the comparing are executed again after the waiting.

6. The method for controlling a radar apparatus according to claim 5, wherein in a case where a total time period of waiting is greater than a second threshold value in the waiting, execution of the performing of the second reception, the acquiring of the strength, and the comparing after the waiting is stopped.

7. The method for controlling a radar apparatus according to claim 1, further comprising:
   storing the first reception signal obtained in the performing of the first reception, wherein
   in the acquiring of the strength, the strength is acquired using the first reception signal that is stored.

8. The method for controlling a radar apparatus according to claim 1, wherein the first reception signal and the second reception signal are at least one of an I signal or a Q signal.

9. The method for controlling a radar apparatus according to claim 1, wherein the frequency modulation is frequency modulated continuous wave (FMCW) modulation.

10. The method for controlling a radar apparatus according to claim 1, wherein
    the difference signal includes differences in signal strength at a plurality of time points within a predetermined time period, and
    in the acquiring of the strength, the strength is acquired based on the differences in the signal strength at the plurality of time points.

11. The method for controlling a radar apparatus according to claim 1, wherein the first reception signal and the second reception signal each include a signal strength acquired by a plurality of samplings within a predetermined time period.

12. The method for controlling a radar apparatus according to claim 1, wherein the difference signal includes a difference between signal strengths of frequency bands of a plurality of channels.

13. The method for controlling a radar apparatus according to claim 1, wherein
    the radar apparatus includes a generation circuit that generates a modulation signal which is frequency-modulated, and
    the first reception signal and the second reception signal each become a signal including noise based on the modulation signal, when another apparatus is not transmitting a radio wave.

14. The method for controlling a radar apparatus according to claim 13, wherein the noise has a strength that changes with time.

15. The method for controlling a radar apparatus according to claim 13, wherein a time interval between the performing of the first reception and the performing of the second reception is within one second.

16. The method for controlling a radar apparatus according to claim 1, wherein the transmission of the radio wave for detecting the object is stopped throughout an interval between the performing of the first reception and the performing of the second reception.

17. The method for controlling a radar apparatus according to claim 1, wherein
    a time interval between the performing of the first reception and the performing of the second reception is within one second.

18. The method for controlling a radar apparatus according to claim 1, wherein
    the radar apparatus includes: a generator that generates a radio wave for detecting an object;
    a transmitter that transmits the radio wave; and a receiver that receives the radio wave, and
    in the method for controlling a radar apparatus,
    a time interval between the performing of the first reception and the performing of the second reception is a time interval in which a quantity of a signal that leaks from the generator to at least one of the transmitter and the receiver in the state where the transmission of the radio wave is stopped does not change by a predetermined quantity or more.

19. The method for controlling a radar apparatus according to claim 1, wherein the transmission of the radio wave is started when the strength is equal to or less than the first threshold value.

20. A radar apparatus that detects an object using frequency modulation, the radar apparatus comprising:
    a first receiver that receives a radio wave in a state where transmission of a radio wave for detecting the object is stopped, to obtain a first reception signal;
    a second receiver that receives a radio wave in the state where the transmission of the radio wave is stopped, to obtain a second reception signal, immediately after the first receiver obtains the first reception signal;

a signal strength acquirer that acquires a strength of a difference signal between the first reception signal and the second reception signal;

a comparator that compares the strength with a threshold value; and a radar controller configured to control to start the transmission of the radio wave when the strength is equal to or less than the threshold value in the comparison.

21. The radar apparatus according to claim 20, wherein a time interval from when the first reception signal is obtained to when the second reception signal is obtained is within one second.

* * * * *